UNITED STATES PATENT OFFICE.

JOHN W. LOWMAN, OF NASHVILLE, TENNESSEE.

PROCESS OF MAKING FERTILIZING MATERIAL.

No. 922,494.  Specification of Letters Patent.  Patented May 25, 1909.

Application filed March 19, 1908. Serial No. 422,130.

*To all whom it may concern:*

Be it known that I, JOHN W. LOWMAN, a citizen of the United States, and residing at Nashville, in the county of Davidson and State of Tennessee, have invented certain new and useful Improvements in Processes of Making Fertilizing Material, of which the following is a specification, such as will enable those skilled in the art to which it appertains to make and use the same.

This invention relates to the production of available phosphoric acid from phosphate rocks, phosphate bones, phosphate of lime or other substances, and the invention consists in a new and useful process for accomplishing this result without the use of sulfuric acid.

In the practice of my invention, I take phosphate rock, one thousand pounds; common salt, two hundred and fifty pounds; dolomite or magnesium lime stone, two hundred pounds; and fluorspar, fifty pounds. The phosphate rock is first finely pulverized, and the dolomite or magnesium lime stone first well burned and then well pulverized, and the fluorspar is also well burned and pulverized. All the ingredients are then thoroughly mixed with water and thoroughly stirred and mingled until the entire mass is reduced to a plastic condition of the consistency of thick mud or dough. This mass is then subjected to a high temperature by any well known means. In practice I prefer to apply a degree of heat, from six hundred to eight hundred Fahrenheit, in which condition the material is allowed to remain for a period of from eight to twelve hours, when the phosphoric acid contained therein will be released or converted into available phosphoric acid.

In the application of heat as above described if the phosphate rock or other material to be treated is exceedingly dry, a sufficient amount of water is added to slightly dampen the mass, but when the phosphate rock or other material is damp or moist the addition of water will not be necessary.

As is well known, fluorspar usually contains a considerable percentage of carbonate of calcium, and the heating process above described changes the calcium carbonate to quick lime, and the same is also true of dolomite.

It will be understood, of course, that in the above process any equivalent substance or material may be substituted for the phosphate rock, such as phosphate bones, phosphate of lime, phosphate nodules and similar substances; and when the phosphate rock or similar material is highly silicious enough potash may be added to disengage and discharge the same in the form of silicious gas.

In the above operation the potash renders the silicon soluble, and the mass when heated generates a gas, the equation of which is unknown to me at the present time. It will also be apparent that the amounts of the various materials specified may be changed or modified within certain limits, all that is necessary in this connection being that the proportion of parts of each be at least substantially maintained, and while I have specified dolomite or magnesium lime stone, and fluorspar as substances employed in the process herein described and claimed, it will be apparent that other substances having similar chemical constituents may be substituted therefor without departing from the spirit of my invention or sacrificing its advantages.

Having fully described my invention, what I claim as new and desire to secure by Letters Patent, is:—

1. The herein described process of producing a phosphatic fertilizer, which consists in pulverizing a predetermined amount of phosphate material, burning and pulverizing a predetermined amount of dolomite or magnesium lime stone, burning and pulverizing a predetermined amount of fluor-spar, thoroughly mixing all of said material, and reducing the same to a plastic mass by mixing water therewith and then heating the plastic mass thus produced.

2. The herein described process of producing a phosphatic fertilizer, which consists in pulverizing a predetermined amount of phosphate material, burning and pulverizing a predetermined amount of dolomite or magnesium lime stone, burning and pulverizing a predetermined amount of fluor-spar, thoroughly mingling all of said substances, adding a predetermined amount of potash thereto, reducing the product thus formed to a plastic mass by stirring water thereinto, and then heating the said mass.

In testimony that I claim the foregoing as my invention I have signed my name in presence of the subscribing witnesses this 16th day of March 1908.

JOHN W. LOWMAN.

Witnesses:
 JAMES H. CONNOR,
 RICHARD S. WEITZELL.